(12) United States Patent
Yang et al.

(10) Patent No.: US 6,404,175 B1
(45) Date of Patent: *Jun. 11, 2002

(54) MULTI-PHASE AND MULTI-MODULE POWER SUPPLIES WITH BALANCED CURRENT BETWEEN PHASES AND MODULES

(75) Inventors: Eric X. Yang; Jason Guo, both of Santa Clara, CA (US)

(73) Assignee: Semtech Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/757,801

(22) Filed: Jan. 9, 2001

Related U.S. Application Data

(63) Continuation of application No. 09/440,222, filed on Nov. 15, 1999, now Pat. No. 6,215,290.

(51) Int. Cl.[7] .............................. G05F 1/652; G05F 1/44
(52) U.S. Cl. ....................... 323/282; 323/286; 323/222; 323/284
(58) Field of Search ................................ 323/282, 286, 323/290, 222, 284

(56) References Cited

U.S. PATENT DOCUMENTS

| | | | | |
|---|---|---|---|---|
| 4,937,722 A | * | 6/1990 | Deierlein | 363/290 |
| 4,959,606 A | * | 9/1990 | Forge | 323/286 |
| 5,068,572 A | * | 11/1991 | Blankers | 315/209 R |
| 5,731,694 A | * | 3/1998 | Wilcox et al. | 323/287 |
| 5,939,871 A | * | 8/1999 | Tanaka | 323/285 |
| 5,994,885 A | * | 11/1999 | Wilcox et al. | 323/285 |

* cited by examiner

Primary Examiner—Bao Q. Vu
(74) Attorney, Agent, or Firm—Thelen Reid & Priest LLP; David B. Ritchie

(57) ABSTRACT

A multi-phase power supply utilizes a current sensor including a sensor inductor winding connected in parallel with a filter inductor winding at the output of each phase for sensing the phase currents and balancing the current by adjusting the duty cycle of each phase through feedback control. In addition, in a multi-module power supply configuration, current between power supply modules is balanced through use of the same current sensor and current sharing technique. Each phase of the power supply includes at least one input power source and a current sensor. The sensor inductor winding and the filter inductor winding have the same number of turns and are wound about a magnetic core also present at each phase. A differential amplifier at each phase senses and amplifies any voltage difference between the outputs of the sensor inductor winding and the corresponding filter inductor winding. A current-sharing bus is formed between each of the phases, carrying the summed and averaged outputs from all the differential amplifiers. A feedback correction circuit at each phase utilizes the voltage on the current-sharing bus as a reference to control a pulse width modulator in adjusting the duty cycle of the corresponding phase, thereby balancing the load current among the phases. In a multi-module, multi-phase power supply, the current-sharing bus and a voltage-sharing bus are extended between each module and the phases of each module to achieve the same current balancing between all phases and modules.

3 Claims, 8 Drawing Sheets

MULTI-PHASE AND MULTI-MODULE POWER SUPPLIES WITH BALANCED CURRENT BETWEEN PHASES AND MODULES

This application is a continuation of Ser. No. 09/440,222 filed Nov. 15, 1999 now U.S. Pat. No. 6,215,290.

BACKGROUND OF THE INVENTION

1. Field of the Invention

The present invention is generally directed to balancing current among phases and modules in multi-phase power converters and multi-module power supply systems. More specifically, the present invention is directed to a current sensing scheme for sensing phase currents in a multi-phase power supply and adjusting phase duty cycles accordingly through feedback control.

2. Background

Current trends indicate that future microprocessors will exhibit much heavier loads and require power supplies which can provide higher current at lower voltages. Presently, high current requirements are being met with power supplies configured as multi-phase switching mode converters operated in an interleaf mode. Interleaf operation effectively reduces the current ripple seen by the filter capacitor and makes the ripple frequency be multiples of the switching frequency.

Such multi-phase converters in interleaf mode are known in the art. A multi-phase interleaved converter with two phases is illustrated in FIG. 1A. The dashed lines in FIG. 1A indicate additional phases can be included in this multi-phase configuration. The resulting effective reduction in ripple current from this two-phase interleaved converter configuration is indicated by $I_0$ as shown in FIG. 1B. A single-phase configuration is also represented above the dashed line in FIG. 1A. The circuit represented above the dashed line in FIG. 1A is commonly referred to as a synchronous buck converter. In contrast to the multi-phase interleaved converter configuration, where $I_0$ includes the ripple canceling effect of $i_1$ and $i_2$ as shown in FIG. 1B, the single-phase configuration results in a large output ripple current where $I_0$ is equal to $i_1$. Consequently, single-phase configurations require large and bulky output filter capacitors. It is therefore clear that use of the multi-phase converter circuit in interleaf mode is desirable. Advantages of the multi-phase converter circuit in interleaf mode include a smaller filter capacitance needed for static operation, less RMS current drawn from the input capacitor, lower filter inductance needed to speed up the converter dynamic response, and a spreading of the thermal loads among power semiconductor devices.

With the continuing advancement of personal computers into higher-end applications, the merits of the multi-phase power supply configurations in interleaf mode become increasingly attractive for next generation PC power management. Such applications often employ more than one microprocessor, giving rise to the need for paralleling power supply modules to meet the high current load requirements. However, a limitation in presently available interleaved parallel power technology is in sensing current needs in the larger loads and distributing the current load requirements among the various power supply modules and among the various phases within these modules.

In a multi-phase configuration, it is important that all of the phases share a heavy load. In a configuration of multiple power supply modules, it is likewise important that a heavy load be distributed among the modules. In practical circuits, there are various factors contributing to uneven load sharing, including mismatches in the control timing among phases, variation of the power switch parameters, and different printed circuit board (PCB) layouts among phases or modules. Controlling these factors by narrowing their distributions requires a significant addition in margins and costs to circuit designs.

Conventional approaches in sensing and sharing current load requirements include the use of sensing resistors and current transformers. However, sensing resistors reduce converter efficiency by dissipating too much power. The higher the current requirements in a low voltage, high current converter, the more power the sensing resistor dissipates. Current transformers are bulky and expensive and likewise reduce converter efficiency in low voltage, high current converters.

Accordingly, there exists a need for a simple and inexpensive way to sense the phase currents in multi-phase power supplies and equitably distribute the load current requirements among phases in multi-phase power supply configurations and among power modules in multi-module power supply configurations.

SUMMARY OF THE INVENTION

A multi-phase power supply utilizes a current sensor including a sensor inductor winding connected in parallel with a filter inductor winding at the output of each phase for sensing the phase currents and balancing the current by adjusting the duty cycle of each phase through feedback control. In addition, in a multi-module power supply configuration, current between power supply modules is balanced through use of the same current sensor and current sharing technique. Each phase of the power supply includes at least one input power source and a current sensor. The sensor inductor winding and the filter inductor winding have the same number of turns and are wound about a magnetic core also present at each phase. A differential amplifier at each phase senses and amplifies any voltage difference between the outputs of the sensor inductor winding and the corresponding filter inductor winding. A current-sharing bus is formed between each of the phases, carrying the summed and averaged outputs from all the is differential amplifiers. A feedback correction circuit at each phase utilizes the voltage on the current-sharing bus as a reference to control a pulse width modulator in adjusting the duty cycle of the corresponding phase, thereby balancing the load current among the phases. In a multi-module, multi-phase power supply, the current-sharing bus and a voltage-sharing bus are extended between each module and the phases of each module to achieve the same current balancing between all phases and modules.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons after a perusal of this disclosure.

Figure 1A:
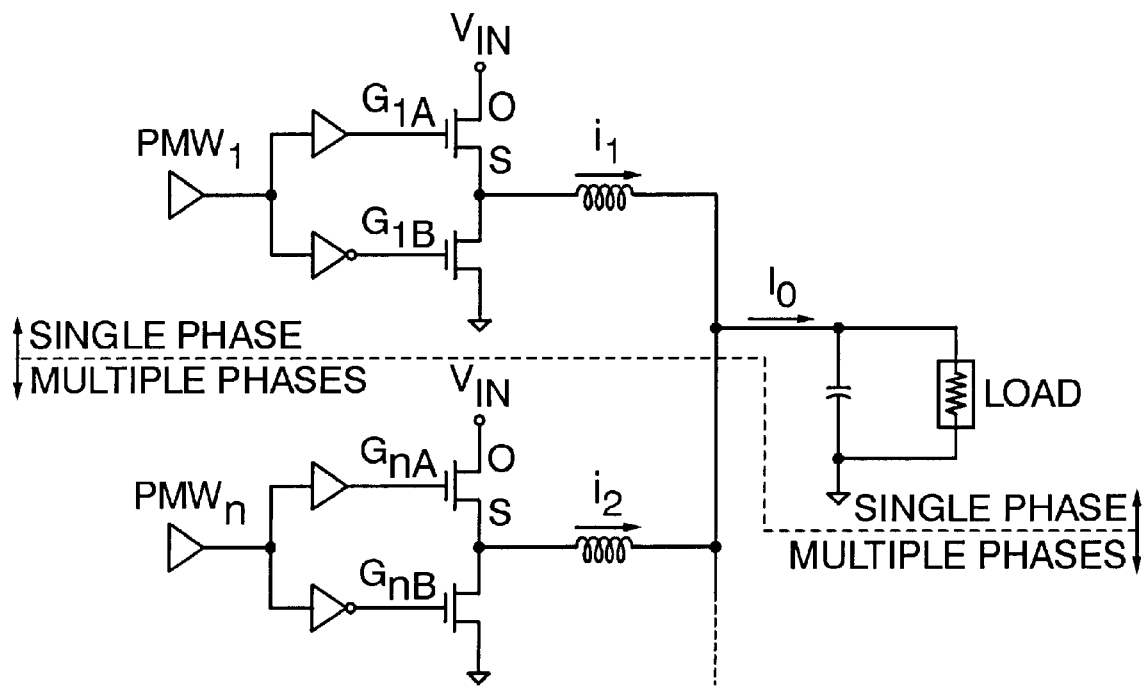
FIG. 1A is an electrical schematic diagram in accordance with the prior art illustrating a multi-phase (showing two phases) interleaved converter and also depicting a single-phase converter or synchronous buck converter circuit.
Figure 1B:
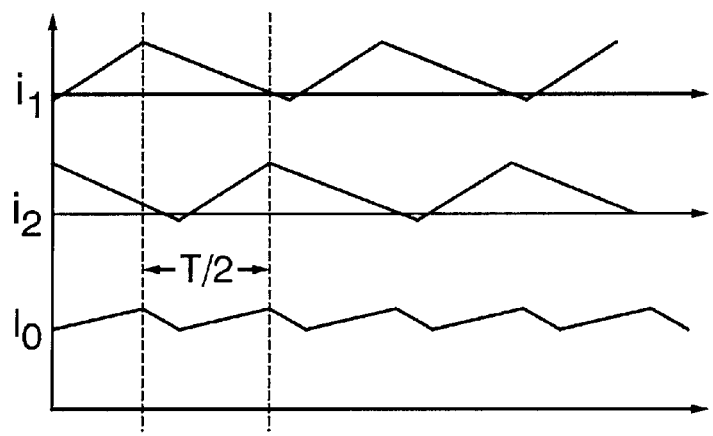
FIG. 1B is a plot of the ripple currents $i_1$ and $i_2$ from the multi-phase interleaved converter of FIG. 1A and resulting effective reduction in these ripple currents, $I_0$.
Figure 2:
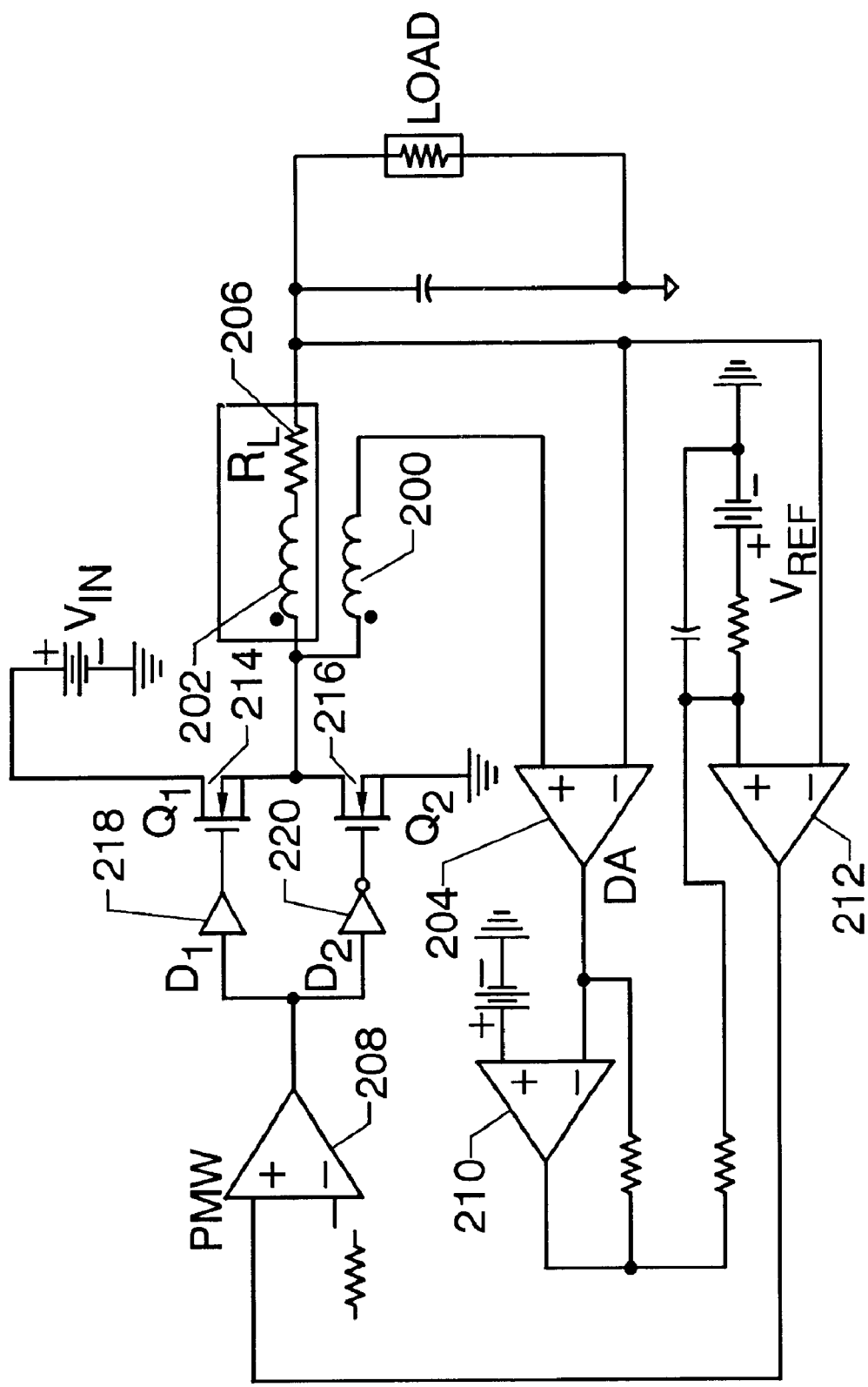
FIG. 2 is an electrical schematic diagram of a current sensor in accordance with one embodiment of the present invention incorporated with a single-phase converter or synchronous buck converter circuit as illustrated in FIG. 1A.

A first embodiment of the present invention is illustrated schematically in FIG. 2. In this circuit, the current sensor scheme is incorporated with the single-phase converter that is illustrated as part of FIG. 1A. The current sensor comprises a small sensor inductor winding 200 on the output filter inductor winding 202 and a differential amplifier 204 for sensing and amplifying the voltage difference between the outputs of the two windings 200, 202. The sensing method utilizes the inductive resistance, $R_L$ 206, of the filter inductor winding 202. The small sensor inductor winding 200 and the output filter inductor winding 202 have the same number of turns. In addition, the current flowing through the sensor inductor winding 200 into the differential amplifier 204 is negligible due to the high input impedance of the differential amplifier 204. Therefore, the voltage drop across $R_L$ 206 is detectable by the differential amplifier 204 since the large Ldi/dt voltage across both the windings 200, 202 cancel one another. The differential amplifier 204 thus senses and then amplifies the voltage drop across $R_L$ 206. The differential amplifier 204 output is then used with conventional feedback control circuitry to adjust the conduction duty cycle of the phase.

Briefly, the feedback control circuit comprises a correction amplifier 210 which uses the differential amplifier 204 output to adjust the reference voltage at the input to an error amplifier 212. The error voltage generated by the error amplifier 212 acts as one input to a pulse width modulator (PWM) comparator 208 whose other input is a periodic saw-tooth waveform. The PWM comparator 208 generates an on-off switching signal which drives switches Q1 214 and Q2 216 alternately through drivers D1 218 and D2 220. A change in load current sensed by the differential amplifier 204 creates change in the error voltage input to the PWM comparator 208, resulting in a change in the output voltage to the load. Therefore, as the output voltage from the differential amplifier 204 varies, the reference voltage also varies to reflect the load current change. The feedback control can be used to effectively program the output impedance of the power supply to change its stiffness. This is often desirable when the outputs of more than one single-phase converter are connected, as in a second embodiment of the present invention described below.

Figure 3:
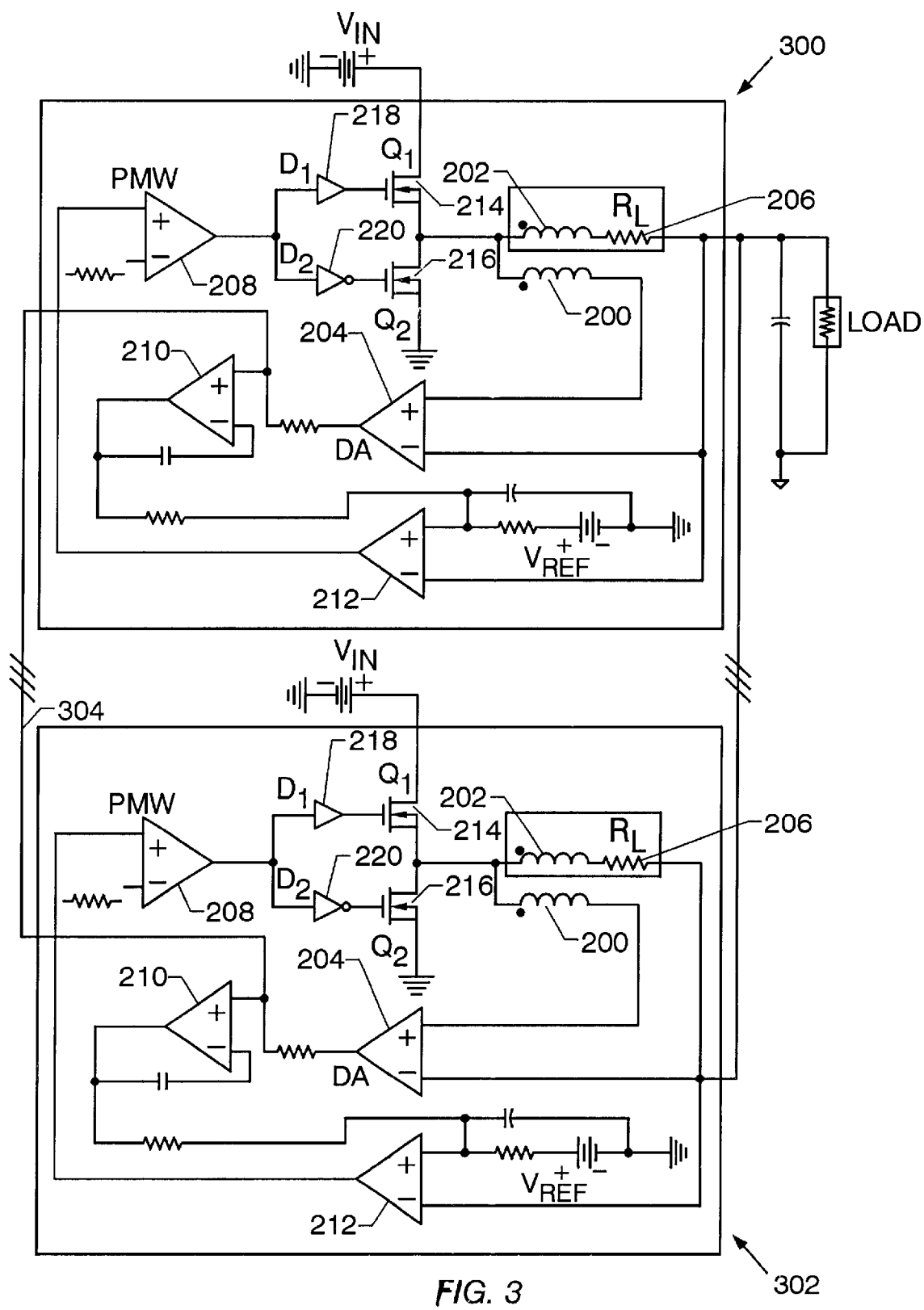
FIG. 3 is an electrical schematic diagram of a multi-module, single-phase converter power supply system in accordance with one embodiment of the present invention where the modules are linked through a current-sharing bus.

A second embodiment of the present invention as illustrated in FIG. 3, is a variation of the first described embodiment. In this embodiment, the single-phase converter configuration of FIG. 2 is expanded to include multiple single-phase converter modules 300, 302 which are linked together through a current-sharing bus (I_Share) 304. Although FIG. 3 depicts only two single-phase converter modules 300, 302 linked together, this is not a limitation, as there can be numerous such modules linked together. The current-sharing bus (I_Share) 304 carries the summed and averaged outputs of the differential amplifiers 204 from each single-phase converter module 300, 302. The voltage on the current-sharing bus (I_Share) 304 acts as a reference to the correction amplifiers 210 in the single-phase converter modules 300, 302 in order to vary the reference voltage at the input to each error amplifier 212. The error voltages generated by the error amplifiers 212 in each of the single-phase converter modules 300, 302 cause the PWM comparators 208 to adjust the on-off switching signals controlling switches Q1 214 and Q2 216. This results in a change in the output voltage to the load and a balanced load current among all the single-phase converter modules 300, 302.

Figure 4:
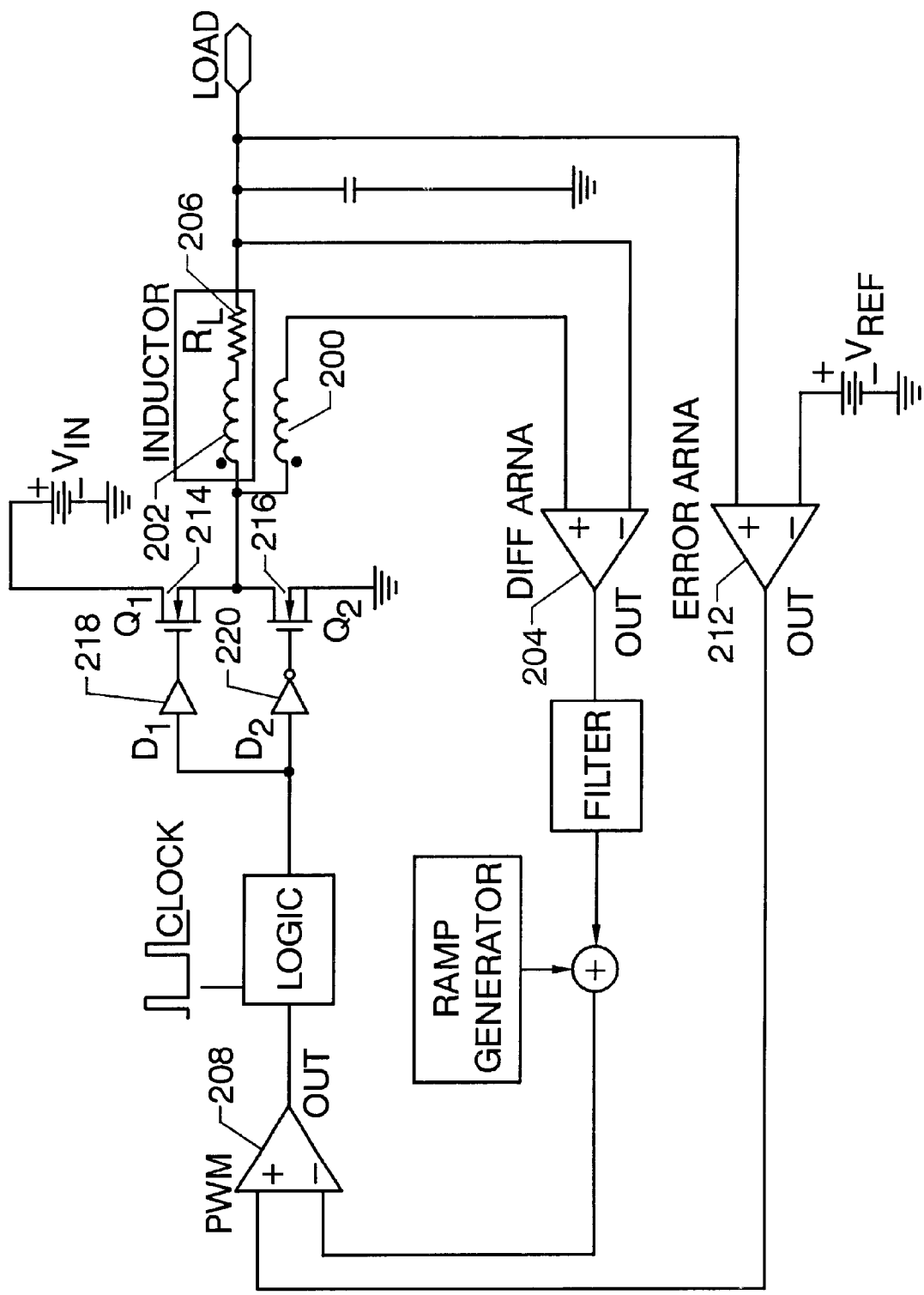
FIG. 4 is an electrical schematic diagram of a current sensor in accordance with an alternative embodiment of the present invention implemented as a single-phase converter in a current-mode-controlled dc-to-dc switching converter.

In a third embodiment of the present invention, as illustrated in FIG. 4, the current sensing scheme is employed in a current mode controlled dc—dc switching regulator. The output of the differential amplifier 204 is the sensed inductor current information. This signal can be properly filtered and then compensated by a ramp signal when sub-harmonic oscillation is a problem. The resulting signal serves as the ramp signal for the PWM comparator 208, which uses the error amplifier 212 output as another PWM comparator 208 input to control the top switch Q1 214 turn-on period.

Figure 5:
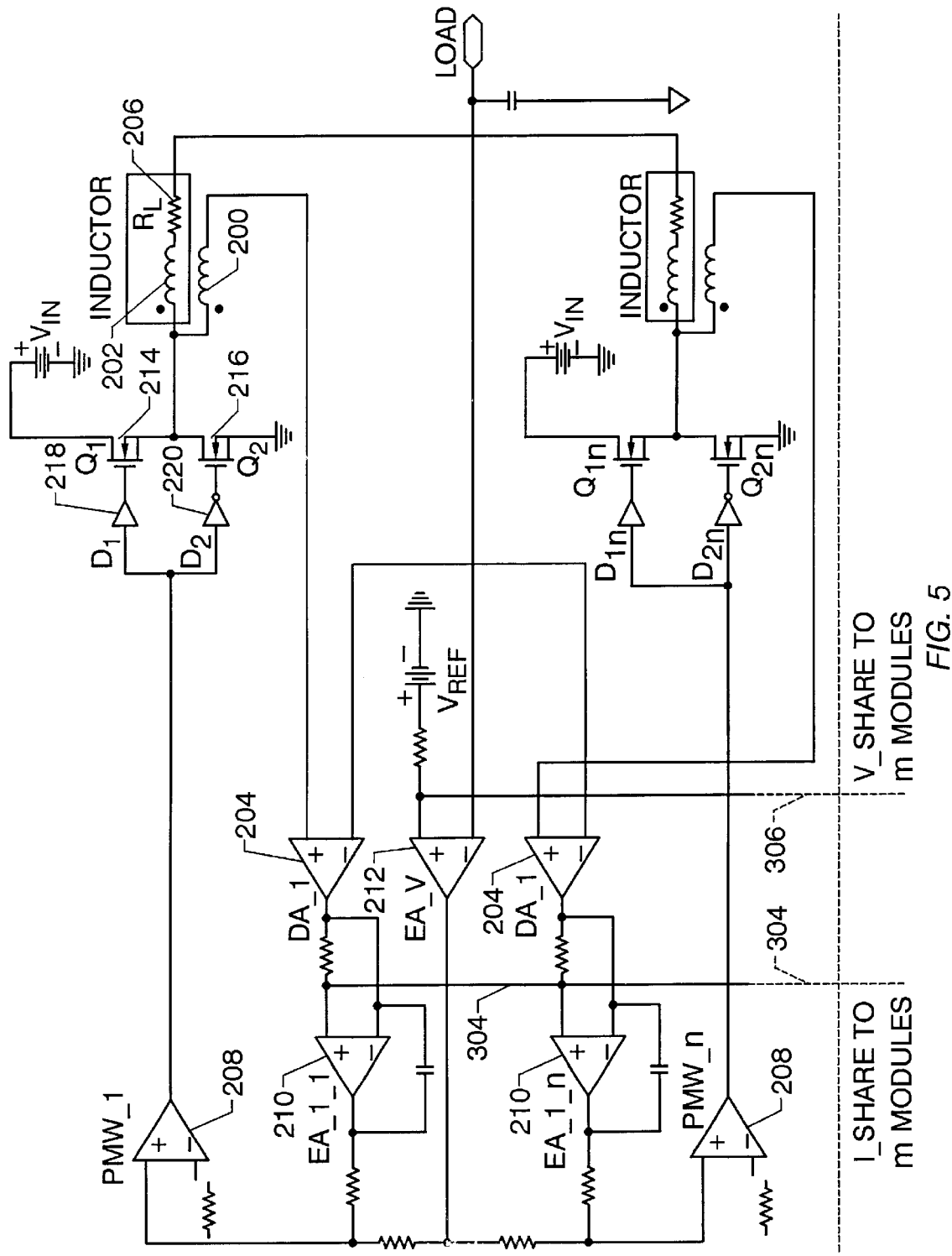
FIG. 5 is an electrical schematic diagram of a current sensor and current sharing scheme incorporated in a multi-phase converter in accordance with another embodiment of the present invention.

In a fourth embodiment of the present invention, as illustrated in FIG. 5, the current sensor and current sharing scheme are incorporated in a multi-phase converter. The illustration of FIG. 5 depicts phases numbered 1 through n. The current sensing scheme is as previously described in prior embodiments. However, in this embodiment the current-sharing bus (I_Share) 304 carries a summed and averaged output of all the differential amplifiers 204 from each phase of the multi-phase converter. The voltage on the current-sharing bus (I_Share) 304 therefore acts as a reference to the feedback correction circuits in each phase. Thus, the sensed inductor current information from each differential amplifier 204 output acts in an aggregate manner to adjust error voltage inputs to the PWM comparators 208. The PWM comparators 208 for each phase vary conduction duty cycles accordingly through on-off switching signals to drivers 218, 220, resulting in load current which is balanced among the phases of the multi-phase converter.

A fifth embodiment of the present invention is also illustrated in FIG. 5 by the dashed lines depicting the current-sharing bus (I_Share) 304 and the voltage-sharing bus (V_Share) 306 being shared among additional modules of multi-phase converters. In this embodiment, multiple modules of multi-phase power converters are linked together through the current-sharing bus (I_Share) 304 and the voltage-sharing bus (V_Share) 306. The current-sharing bus (I_Share) 304 carries the summed and averaged outputs of all the differential amplifiers 204 between each multi-phase converter module, and the voltage-sharing bus (V_Share) 306 carries the summed and averaged reference voltage of all the modules between each multi-phase converter module, resulting in a sharing of the load current between all the phases of any number of multi-phase converter modules.

Figure 6:
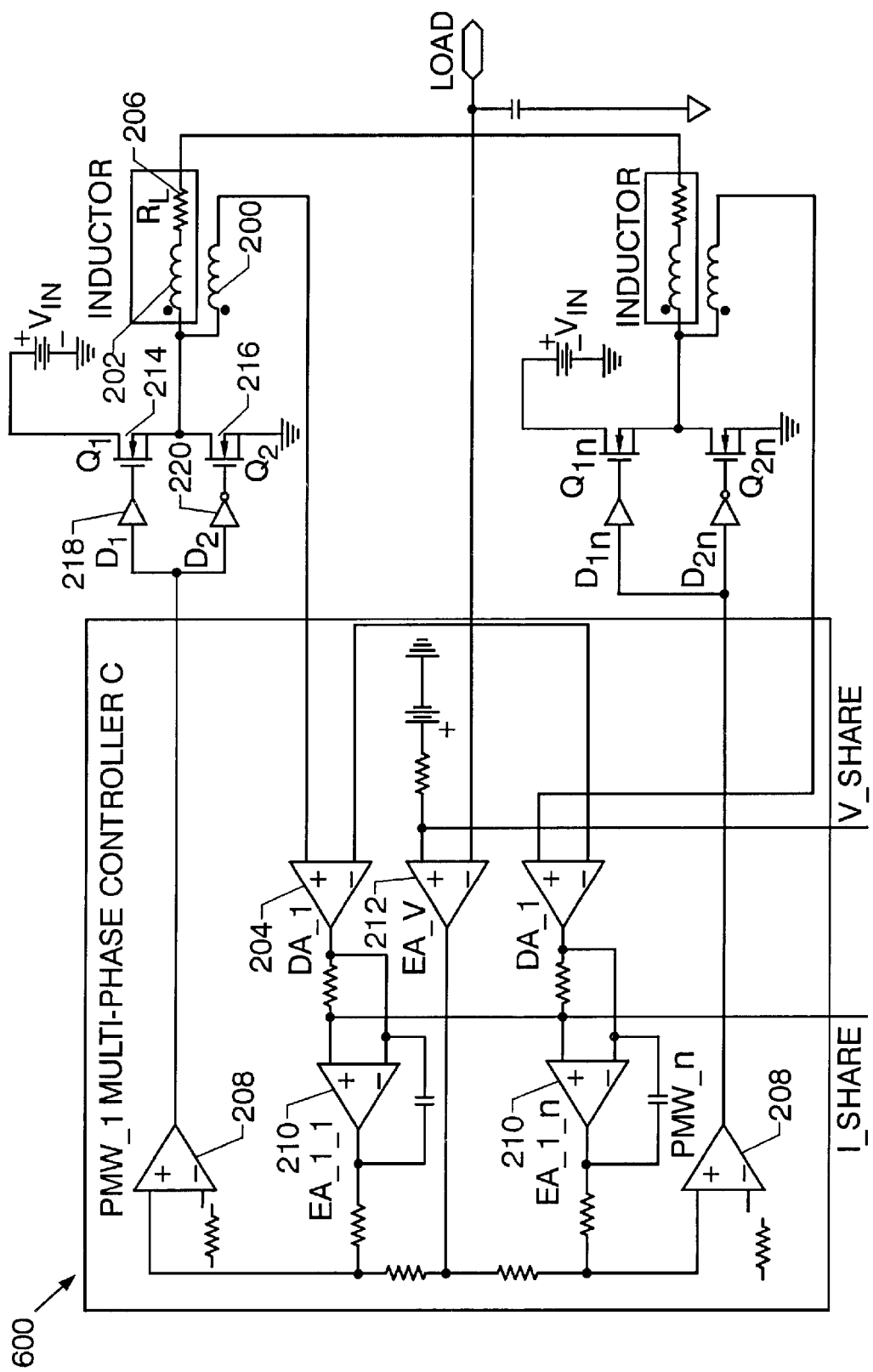
FIG. 6 is an electrical schematic diagram of a current sensor and current sharing scheme incorporated in a multi-phase converter with the current sensing differential amplifiers and feedback circuitry implemented as a multi-phase controller integrated circuit in accordance with another embodiment of the present invention.
Figure 7:
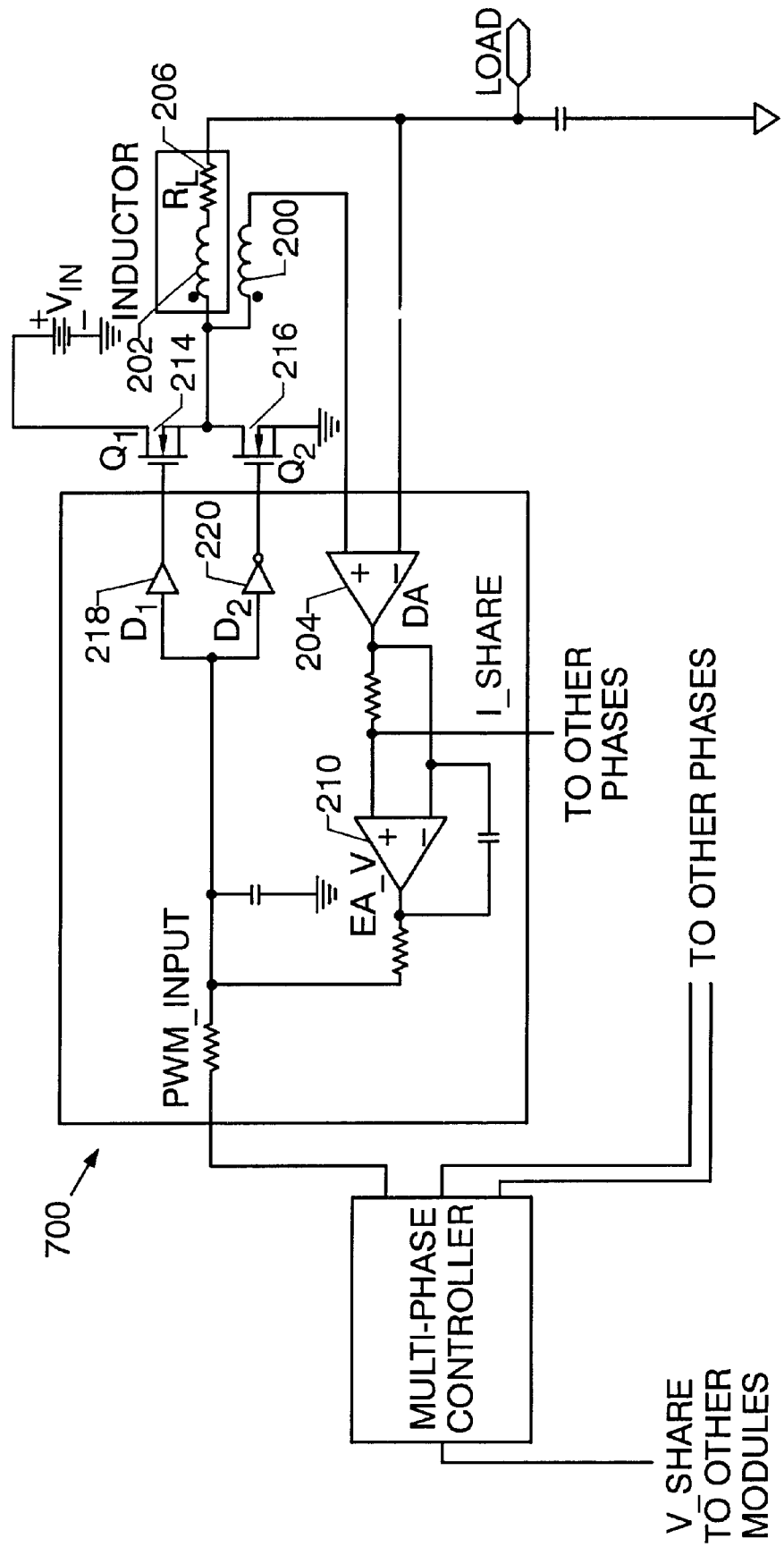
FIG. 7 is an electrical schematic diagram of current sensor and feedback correction circuits integrated into the power converter driver in accordance with another embodiment of the present invention.
Figure 8:
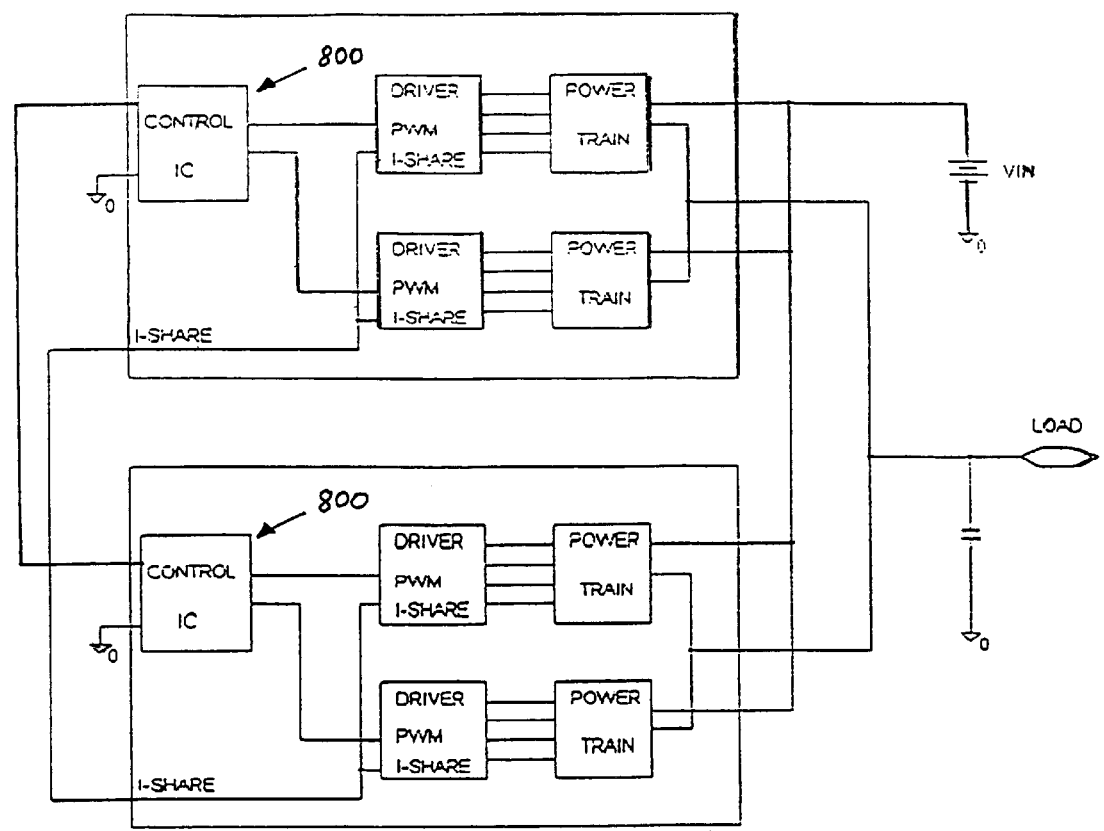
FIG. 8 is a block diagram of a multi-module power supply system showing a multi-phase controller integrated circuit in each power supply module in accordance with another embodiment of the present invention.

Advantages of the present invention are further demonstrated by embodiments as illustrated in FIGS. 6, 7, & 8, where various integrated circuit implementations are suggested. In FIG. 6 is shown the multi-phase converter of FIG. 5 with the current sensing differential amplifiers 204 and feedback circuitry implemented as a multi-phase controller integrated circuit 600. The feedback circuitry includes the error amplifiers 210, 212 and PWM comparators 208. In FIG. 7, the current sensor differential amplifier 204 and error amplifier 210 portion of the feedback correction circuits are integrated into the power converter driver 700 to realize the current sharing in a multi-phase converter. The integrated power converter driver 700 additionally comprises drivers D1 218 and D2 220. A multi-module power supply system is illustrated in FIG. 8 in block form, showing a multi-phase controller integrated circuit 800 in each power supply module.

These and other advantages of the present invention which will be apparent to those of skill in the art, overcome a number of significant limitations of the prior art. For example, the disadvantage of too much power dissipation in conventional current sensing schemes is overcome with the low cost current sensor which does not generate extra power loss. The disadvantage of having to use bulky and expensive current transformers is overcome by the use of the differential amplifier, filtering, and feedback correction circuitry which are all well suited for integrated circuit implementation. Additional advantages include the use of electronic circuitry which operates at low speed and does not interfere with the main feed-back loop of the converter and an accuracy of current balance between phases as good as 5%.

ALTERNATIVE EMBODIMENTS

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of balancing current between phases in a multi-phase power supply, the multi-phase power supply having at least one input power source for supplying current for each of the phases, a filter capacitor at the output of each of the phases, a sensor inductor winding at the output of each of the phases, the sensor inductor winding having an input and an output, a filter inductor winding at the output of each of the phases, the filter inductor winding having an input and an output, wherein the sensor inductor winding and the filter inductor winding have the same number of turns and the input of the sensor inductor winding and the input of the filter inductor winding are connected together at the output of each of the phases, and a magnetic core at each of the phases, about which a corresponding sensor inductor winding and a corresponding filter inductor winding are wound, the method comprising:

sensing and amplifying a voltage difference between the outputs of the sensor inductor winding and the filter inductor winding at each of the phases;

summing and averaging the results of each sensing and amplifying, forming a current-sharing bus between each of the phases;

referencing to the voltage on the current-sharing bus at each of the phases; and adjusting the duty cycle of each phase of the multi-phase power supply whereby the balancing is achieved.

2. A method of sensing current changes through a filter inductor winding in a power supply system, the filter inductor winding having an input and an output, the power supply system including at most one sensor inductor winding having an input and an output, wherein the sensor inductor winding has the same number of turns as the filter inductor winding and the input of the sensor inductor winding is connected to the input of the filter inductor winding, the method comprising:

sensing and amplifying a voltage difference between the outputs of the filter inductor winding and the sensor inductor winding.

3. A circuit for sensing current changes through a filter inductor winding in a power supply system, the filter inductor winding having an input and an output, the circuit comprising:

at most one sensor inductor winding having an input and an output, wherein the sensor inductor winding has the same number of turns as the filter inductor winding and the input of the sensor inductor winding is connected to the input of the filter inductor winding; and means for sensing and amplifying a voltage difference between the outputs of the filter inductor winding and the sensor inductor winding.

* * * * *